(12) United States Patent
Cho et al.

(10) Patent No.: US 6,616,725 B2
(45) Date of Patent: Sep. 9, 2003

(54) SELF-GROWN MONOPOLY COMPACT GRIT

(76) Inventors: Hyun Sam Cho, 1804 Fort Douglas Cir., Salt Lake City, UT (US) 84103; John Chen, 1F No. 4 Alley 9 Lan 34 Win Chuan Rd., Peitou Taipei (TW); Kyung Yul Han, 107-201 Kuk Dong APT DuJong-Dong, Chung Chung Nam-Do (KR)

( * ) Notice: Subject to any disclaimer, the term of this patent is extended or adjusted under 35 U.S.C. 154(b) by 0 days.

(21) Appl. No.: 09/934,459

(22) Filed: Aug. 21, 2001

(65) Prior Publication Data

US 2003/0044613 A1 Mar. 6, 2003

(51) Int. Cl.[7] .............................. B24D 3/00; C09C 1/44; C09C 1/68
(52) U.S. Cl. ........................... 75/231; 419/11; 423/446; 51/307
(58) Field of Search ....................... 419/45, 11; 75/231, 75/243, 565; 423/446; 51/307

(56) References Cited

U.S. PATENT DOCUMENTS

| | | | |
|---|---|---|---|
| 2,947,609 A | | 8/1960 | Strong |
| 4,287,168 A | | 9/1981 | Wentorf, Jr. et al. |
| 4,927,619 A | | 5/1990 | Tsuji |
| 4,944,772 A | * | 7/1990 | Cho ........................... 51/293 |
| 5,011,514 A | * | 4/1991 | Cho et al. ..................... 51/295 |
| 5,114,696 A | | 5/1992 | Purdes |
| 5,130,111 A | | 7/1992 | Pryor |
| 5,151,107 A | * | 9/1992 | Cho et al. ..................... 51/295 |
| 5,273,730 A | | 12/1993 | Yoshida et al. |
| 5,385,715 A | | 1/1995 | Fish |
| 5,454,343 A | | 10/1995 | Eun et al. |
| 5,466,269 A | | 11/1995 | Corrigan et al. |
| 5,560,241 A | | 10/1996 | Satoh et al. |
| 5,603,070 A | | 2/1997 | Cerutti et al. |
| 5,772,756 A | | 6/1998 | Davies et al. |
| 5,980,982 A | * | 11/1999 | Degawa et al. ............. 427/185 |

\* cited by examiner

Primary Examiner—Daniel J. Jenkins
(74) Attorney, Agent, or Firm—Thorpe North and Western, LLP (57) ABSTRACT

A self-grown monopoly compact grit and high pressure, high temperature process for preparing the same. The high pressure, high temperature sintered/synthesized monopoly compact grit is used in various industrial tools such as saw blades, grinding wheels, cutting tools and drill bits. Further, the monopoly compact grit of the present invention is produced from a seed of a mono-crystal of diamond or cubic boron nitride surrounded by either a self-grown crystal layer or an integrally bonded poly-crystalline sintered compact layer. The self-grown crystal layer is a new grown crystal structure where the seed crystal grows into a new phase through a normal diamond or cubic boron nitride synthesis process in the presence of a catalyst metal solvent. The compact layer is composed of about 50 to about 90 volume percent of diamond or cubic boron nitride, a typical binder material, which is a catalyst for crystal-to-crystal bonding, and a cementing agent which is a binding agent capable of forming stable carbide and nitride bonds.

45 Claims, 7 Drawing Sheets

SELF-GROWN MONOPOLY COMPACT GRIT

THE FIELD OF THE INVENTION

The present invention relates generally to methods of forming synthetic diamond or polycrystalline diamond (PCD). More specifically, the present invention relates to a new, high pressure-high temperature (HPHT) sintered/synthesized, self-grown, monopoly compact grit and methods of preparation thereof.

BACKGROUND OF THE INVENTION

Diamond is a gemstone known for its rarity and beauty. As an industrial material, its superior hardness and wear resistance make diamond a preferred material in a variety of applications. For example, diamond is used extensively as an abrasive in polishing operations. Additionally, diamond-tipped drills and cutting tools are indispensable in shaping and cutting extremely hard materials such as sintered carbide and quartz. In order to help meet the industrial demand for these types of tools, a number of techniques have been developed for the production of synthetic diamonds. While natural diamond is still used in many industrial applications, diamond synthesis is emerging as the solution to the problem of inadequate supply of this unique material.

Diamond has a cube lattice, in which each carbon atom is covalently bonded to four other carbons to form a tetrahedron. This structure is repeated throughout the crystal and it is believed that this configuration of carbon—carbon bonds produces the extreme hardness of diamond. It has been discovered that at high temperatures and pressures, the conversion of carbon to diamond occurs at an appreciable rate. This phenomenon gave rise to the first synthetic high-pressure diamonds fabricated in the early 1950's.

A synthetic diamond grit manufacturing method is disclosed in U.S. Pat. No. 2,947,609 (1960) to Herbert M. Strong, hereby incorporated by reference. A polycrystalline diamond compact with a metal bonded carbide substrate is described in U.S. Pat. No. 3,745,623 (1975) to Robert Wentorf Jr. et al, hereby incorporated by reference. Similarly, a polycrystalline cubic boron nitride with a metal bonded carbide substrate is disclosed in U.S. Pat. No. 3,743,489 to Robert Wentorf Jr. et al, also hereby incorporated by reference. A great deal of effort has been expended to increase the economy of preparing diamond grits under the HPHT conditions, however, commercial production of synthetic diamond grits, using the HPHT process is still a very expensive operation. Therefore, continuous attempts have been made both for the manufacturing of quality diamond grits and to develop an optimum HPHT diamond synthesis process for converting less expensive forms of carbon, such as graphite, into expensive diamonds.

There are two methods for the synthesis of diamond crystals at ultra-high pressure and high temperatures, which are generally well known in the art. The first method is the "temperature gradient method," and the second is the "thin film solvent method."

The "temperature gradient method," involves using transitional metal elements, i.e. Fe, Co, Ni, Cr, Mn, Pt, etc. or alloys thereof, as a solvent metal. By this method, a diamond seed crystal is separated from a carbon source by the solvent metal so that the carbon source and the diamond seed crystal are not in contact with one another. By maintaining the temperature of the seed crystal at a relatively lower level than that of the contact surface of the carbon source and solvent metal, and allowing this assembly to stand at a high pressure and high temperature causes epitaxial growth of diamond on the seed crystal. See U.S. Pat. Nos. 4,034,066 and 4,632,817, which are hereby incorporated by reference.

The "thin film solvent method" can be performed in two different ways. The first way consists of creating a reaction mixture of a non-diamond carbon source powder, a solvent metal powder, and seed crystal. The reaction mixture is then placed under temperature and pressure conditions in the diamond stable region, sufficient to convert the non-diamond carbon source into diamond in a relatively short time. The second way is by creating a reaction system which includes a plate of a non-diamond carbon source, or a laminate thereof, a plate of solvent metal, and optionally a seed crystal, and placing the system at a temperature and pressure within the diamond stable range, such that the non-diamond carbon source is converted into diamond within a relatively short period of time.

The above described temperature gradient method is capable of synthesizing a relatively large grain size crystal. However, it presents several problems. First, the synthesis reaction takes a very long time, thus increasing the operation costs of the apparatus required to affect the carbon to diamond transition. Additionally, because the method requires a temperature gradient to be created in a relatively small sample chamber, the number of crystals which can be produced in a single reaction is small. Therefore, the small crystal yield increases the production costs of each crystal.

The "thin film solvent method", solves many of the problems inherent in the "temperature gradient method", but increases the frequency of other problems such as spontaneous nucleation. Such problems give rise to great difficulty in synthesizing crystals of a large grain size, and make the crystals produced inferior in quality as they may be contaminated with many inclusions.

In the typical diamond synthesis from carbonaceous materials utilizing a catalyst solvent material, a process for yielding a higher commercial quality valued diamond is the key to success. Needless to say, a higher commercial value diamond is directly related to both a higher product quality and a larger crystal size. The higher the crystal quality and the larger the size, the higher the value of the diamond. Product quality is generally graded according to the compressive and impact strength of the crystal. Crystal shape and internal clarity are also barometers of quality. A large size crystal is more valued as compared to a small size crystal. However, the manufacturing cost for growing larger diamond in the HPHT process is higher because of the required longer reaction/synthesis time and a relatively lower yield under HPHT conditions.

Large diamond crystals (up to 1.0 carat) are commercially produced using the technique of a seed diamond being placed in contact with the catalyst solvent and an available carbon source under long duration of high temperature and high pressure conditions. Such a process is cost and quality prohibitive from being utilized on a mass production scale.

The typical grit size which is used in the construction industry for items such as diamond saws and drill bits, is in the range of 20/30, 30/40, and 40/50 mesh. Although the current HPHT diamond synthesis processes have been significantly improved over a decade of active research and development efforts, these processes are still below desirable level for the efficient production of large crystals (20~50 mesh). Therefore, none of the current processes have so far been fully satisfactory in the super hard materials manufacturing industry.

Another problem inherent to many diamond grit applications such as diamond saw blades, grinding wheels and drill bits is obtaining a crystal shape which provides greater performance than that of existing crystals. Desirable shapes include cubic, octahedral, and needle-like shapes. The production of crystals having such shapes is not readily commercially available.

Yet another problem inherent in typical polycrystalline diamond (PCD) and cubic boron nitride compact (PCBN) applications, such as turning tools and wire dies, is producing ultra-fine grained (0.1~0.5 μm) microstructure which provides a mirror-like surface finish to the product (optical lenses, aluminum, etc.). The production of such fine grained PCD or PCBN is not commercially and economically readily available.

For all intents and purposes, the quality and performance of diamond grits incorporated into tools such as saw blades, other cutting tools, and drill bits is primarily based upon the length of time which the grit will last under the impact and wear loads imposed thereon while being used in contact with a workpiece such as stone, concrete, or engineered materials. In fact, it has been discovered that shortened diamond grit performance is primarily due to the crushing effect imposed upon it by the workpiece rather than a wearing or abrading effect. Therefore, compressive and impact loading are key indicators of the potential performance of a diamond grit. Further, it has become well known that the impact strength of a single diamond crystal is far inferior to that of a polycrystalline diamond (PCD).

A "self-grown monopoly compact grit", made by the process of this invention has unique physical properties as well as being economically feasible for large scale manufacture. Such a combination of advantages provides a significant improvement in the art of diamond synthesis. Particular areas of application of the crystals or PCD grits of this invention are the areas of saw blade, drill bit, cutting tool, dies, and grinding formations. In these areas, the impact strength of the diamond crystal provides a tool with greatly increased resistance to wear. Additionally, the crystals or PCD grits of the present invention may be formed in a number of desirable shapes in an economic and efficient manner.

Another well-known utility for synthetic diamond or cubic boron nitride (CBN) powders (60~230 mesh) is in the fabrication of grinding tools. Traditionally, grinding wheels have been fabricated according to the types of materials which they are intended to grind. In this arena, diamonds have been traditionally used for grinding non-ferrous containing material, while CBN grinding wheels have been widely used for grinding ferrous containing materials. Consequently, it would be desirable to have a material that is suitable for grinding both materials. By means of the present invention, a "polycrystalline diamond boron nitride grit" (PCDBN) is synthesized from a combination of both diamond and CBN materials under HPHT conditions. This PCDBN possesses significant advantages over conventional CBN materials in ferrous material grinding tests.

OBJECTS AND SUMMARY OF THE INVENTION

It is an object of the present invention to provide a process for producing self-grown diamond crystals and/or monopoly compact PCD grits.

Another object of the invention is to provide stronger and more resilient diamond or CBN grits, as compared to conventionally grown diamonds or CBN grits. A further object of the present invention is to provide a method for producing improved diamond or CBN grits in a cost effective manner.

It is yet another object of the present invention to provide a process for the production of predetermined shapes of diamond or CBN compact grits in a cost effective manner.

Still another object of the present invention is to provide a new PCDBN compact grit product and a method of preparing the same.

These and other objects are accomplished by a self-grown monopoly compact grit produced from an improved HPHT process. The diamond or CBN grit produced by the HPHT process may be either a single crystal or a polycrystalline structure grown over a seed material. In each instance, the diamond or CBN compact grit is designed to be incorporated into a superabrasive industrial tool for cutting, drilling, machining, drawing, dressing, grinding, and/or polishing.

The basic process of diamond synthesis used by the present invention is similar to conventional diamond synthesis, (i.e. using a pressure-temperature-time cycle in the proper thermodynamic region with an available carbon source in the presence of a suitable catalyst solvent).

One aspect of the present invention is to provide a grown diamond crystal or PCD grit having a desired morphology. This synthesis process begins by obtaining a seed crystal and providing a suitable reaction site for controlling and maintaining diamond growth in such a manner that diamond nucleation does not take place. Another aspect of the present invention is to synthesize a new crystal ("monopoly compact grit") which is an as-sintered monopoly diamond with a polycrystalline diamond layer coated around a seed crystal.

According to the present invention, the improved HPHT process includes a series of special chemical treatments for the preparation of monopoly precursor materials which include metallic coating and fluidized bed granulation processes. By utilizing the newly designed HPHT process, it is possible to readily and reproducibly accomplish the manufacture of larger size (20~50 mesh) crystals at a reduced manufacturing cost. Additionally, the HPHT process of the present invention allows the manufacturing of grits in desirable shapes. Most importantly, the large crystals (20~50 mesh) have significantly improved crush strength over similar crystals produced by known HPHT processes. These enumerated advantages of the present invention culminate to provide a significant economic advantage over existing processes for manufacturing metal bond diamond grit products such as saw blades, drill bits and grinding tools.

The product of the present invention may take several different forms. For example, a PCDBN compact grit may comprise a newly grown diamond phase over a CBN seed. Further, either a CBN coating or a diamond phase may be grown over a PCD grit seed. The newly grown diamond phase is either a single crystal or a polycrystalline structure. The newly grown CBN phase can also be a single CBN crystal structure or a polycrystalline CBN structure.

In another aspect of the present invention, the monopoly compact grit is formed of the following optional materials: a seed crystal, a polylayer coating, and a reactive or non-reactive medium material. By using different combinations of materials similar products resulted.

The self-grown monopoly diamond, CBN, PCD, or PCDBN compact grits of this invention are made possible by an improved HPHT process comprising the following steps:

1) Preparing a Seed Crystal:

A crystal seed is properly selected for type (either diamond, CBN, or non-diamond), the size (50~270 mesh); and an optional coating (metallic or non-metallic). The seed crystal may include either a single mono-crystal or multiple crystals bound together to form a single composite multiple-grain seed. The optimal coating layer is prepared from conventional non-electrolytic, electrolytic, and pack-diffusion micro-vaporizing processes as well as spray type granulation processes, which are all well known in the art. Thus, the coating layer is either of a uniform coating thickness or in the form of a loosely packed fine coating powder.

2) Applying a Polylayer Precursor into the Seed Crystal:

A polylayer precursor is prepared by mixing diamond or CBN powders in a suitable bonding agent. The mixture is then applied onto the entire surface of the seed crystal through a counterflow liquid-gas fluidized bed diffusion process. To make a predetermined shaped precursor material, a subsequent simple shaping step can be applied to provide a desirable shape to the seed monopoly crystal.

3) Preparation of a Monopoly Precursor by the Packing of a Polylayer Precursor Coated Seed Crystal:

The monopoly seed crystal having been coated with the polylayer precursors is packed in a proper medium to form a monopoly precursor. The proper medium material is either reactive or non-reactive with diamond or CBN. A mixture of monopoly crystal and graphite powder and/or disc is one example. A mixture of monopoly precursor crystal and alumina powder is another example.

4) Application of Heat and Pressure for a Required Time:

The application of a specified amount of heat and pressure for a specified duration of time to the mixture of monopoly precursors and either reactive or non-reactive materials is required for the formation of the finished monopoly compact grits.

The above and other objects, features and advantages of the invention will become apparent from a consideration of the following detailed description presented in connection with the accompanying drawings which are made in accordance with the present invention.

DETAILED DESCRIPTION

For the purposes of promoting an understanding of the principles in accordance with the invention, reference will now be made to several embodiments of the invention illustrated in the drawings and specific language will be used to describe the same. It will nevertheless be understood that no limitation of the scope of the invention is thereby intended. Any alterations and further modifications of the illustrated device, and any additional applications of the principles of the invention as illustrated herein, which would normally occur to one skilled in the relevant art and in possession of this disclosure, are to be considered within the scope of the invention claimed.

The embodiments disclosed are chosen and described in order to best explain the principles of the invention and its practical application. The following description is intended to enable others skilled in the art to best utilize the invention in various embodiments and with various modifications as are suited to the particular use contemplated.

Synthetic diamond products may take many forms such as mesh, sintered polycrystalline compacts, chemically vapor deposited polycrystalline diamonds, and gems. Mesh products consist of fine, sand-like diamond crystals ranging in size from submicron to coarse 20 mesh. The crystals occur either as single crystals or in small multiple crystal clusters. Such materials include those marketed by General Electric Company under the trade names MBS™, MGB™, and RVG™.

Sintered polycrystalline compacts consist of diamond grains that have been sintered into solid forms such as discs by connecting diamond powders through the action of a catalyst under diamond growing conditions. The sintered products contain small amounts of residual catalysts in the grain boundaries or pores created through the sintering process. The microstructure is dependant on the grain size of the diamond feedstock, and is quasi-isotropic. Sintered products may be leached, in order to remove the residual catalysts from the pores created by the sintering action, thus leaving a catalyst-free material that is thermally stable.

Polycrystalline chemically vapor deposited (CVD) diamonds are dense, metal free, and substantially non-porous. They are prepared by the energetic decomposition of a hydrocarbonaceous species at low pressure. Their microstructure is substantially columnar, and textures, flaws, and defects are dependant on the processing used to generate the polycrystalline diamonds.

Synthetic gems are single crystal products that are coarse, and range in size from about 0.5 carats to greater than about 2 carats. They are dense and generally free of defects. They can only be grown at a very slow rate, making mass production both time consuming and expensive.

The present invention provides a self-grown monopoly compact grit produced by an improved HPHT process. The HPHT synthesized monopoly compact grit comprises a seed of crystal diamond, CBN, or non-diamond surrounded by either a self-grown diamond crystal layer or an integrally bonded PCD compact layer. The self-grown diamond or CBN crystal layer is a newly grown crystal structure formed around the seed where the seed crystal extends into a new phase through a normal diamond or CBN synthesis process in the presence of a catalyst metal solvent. The integrally bonded PCD compact layer is composed of 50–95 volume percent of diamond or CBN, a typical binder material which is a catalyst for crystal-to-crystal bonding (i.e. diamond-to-diamond), and a cementing agent which forms stable carbide and nitride (i.e. diamond-to-nondiamond) bonds.

The present invention provides a diamond crystal with a good morphology, grown from a seed crystal and a monopoly compact PCD grit comprising a polycrystalline diamond layer sintered around a seed crystal. This is achieved by providing a typical HPHT process, which includes a series of special chemical treatments for the preparation of monopoly precursors through metallic coating and fluidized bed granulation processes. The coating and granulation processes are followed by a typical HPHT synthesis/sintering operation. By employing the HPHT process of the present invention, it is possible to readily and reproducibly achieve larger sized crystals (20–50 mesh) at a reduced production cost. Additionally, the process of the present invention enables the production of diamond grits with desired shapes or configurations. Most importantly, however, the newly grown large crystals (20–50 mesh) of the present invention are stronger and more resistant to crushing forces than those diamond mesh grits made from known HPHT processes.

The term "monopoly precursor" or "monopoly precursor material" is intended to mean a material coated around a seed crystal, wherein this material is loosely formed and then either converted to a polycrystalline structure, or consumed as a carbon source during HPHT sintering and synthesis. The HPHT conditions for producing diamond or PCD growth around seed crystals would preferably be those known in the art for producing large diamond crystals such as those described in the U.S. patents mentioned above.

The terms "seed", "seed crystal", and "grain" are used interchangeably and refer to a crystal diamond, CBN, or non-diamond material. The seed is surrounded by either a self-grown diamond crystal layer or an integrally bonded PCD compact layer. The seed may be a single mono-crystal or multiple crystals bound together to form a single multiple-grain seed. The seed and accompanying coatings may be formed into various shapes depending on the desired application. Thus, for convenience the same numeral is used in identifying the seed having differing shapes, i.e. needle, round, etc. Similarly, other features such as coatings and new diamond growth are identified by the same numeral when found on different shaped seeds, grits etc.

Figure 1A:
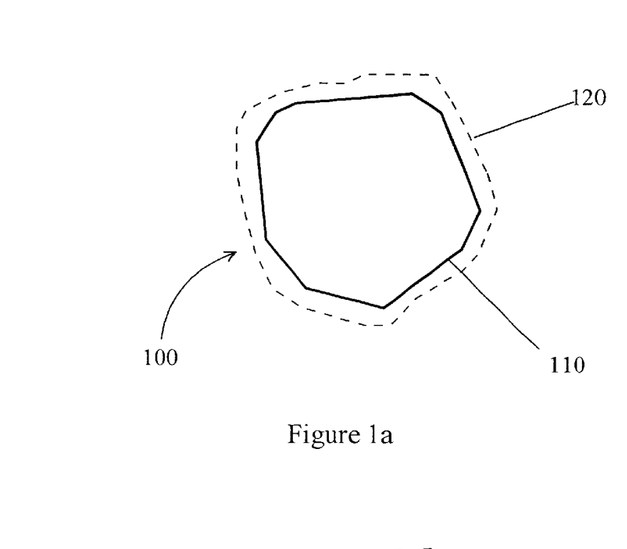
FIG. 1a is a schematic view of a coated seed having only one coat of catalyst metal solvent/binding material.
Figure 1B:
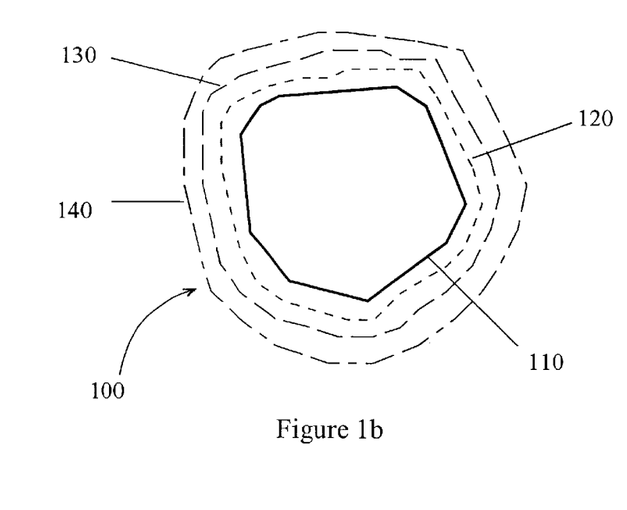
FIG. 1b is a schematic view of a coated seed having multiple coats of a catalyst metal solvent/binding material.
Figure 1C:
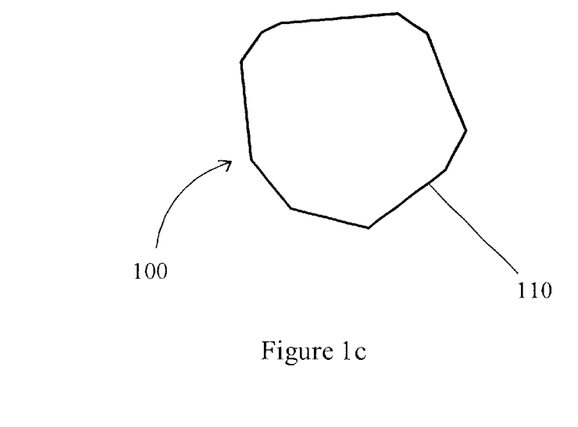
FIG. 1c is a schematic view of an uncoated seed.
Figure 1D:
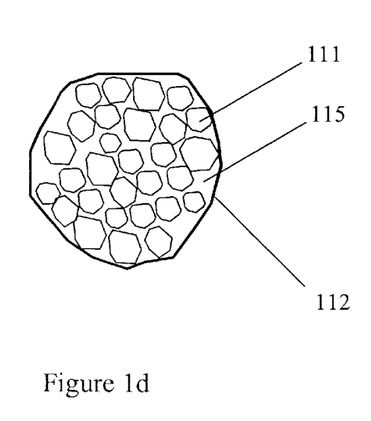
FIG. 1d is a schematic view of a multi-grain seed.

Referring now to FIG. 1a, there is shown a schematic view of a mono-diamond seed 110 indicated generally at 100, with a single metallic coat 120. The seed 110 may be either a diamond or a non-diamond material, such as a metal, carbide, or a ceramic. Additionally, the seed may be in powdered or solid form. The coating 120 may be any metallic material capable of acting as a catalyst metal solvent for facilitating epitaxial diamond growth. In FIG. 1b, the seed 110 has a plurality of catalyst metal solvent coatings as indicated at 120, 130, and 140. In FIG. 1c, a mono-diamond seed 110 is shown with no metal or ceramic coating. By utilizing a non-diamond seed material which is easily shaped, the process of making compact grits with a particularly desired shape, such as a needle-shape, is much easier than with conventional processes which use a diamond seed material. A seed may have a single crystal 110 as shown in FIGS. 1a–1c or be a composite seed 112 containing multiple crystals as shown in FIG. 1d. The composite seed 112 may be formed using a binder such as polyethylene glycol (PEG), polyvinyl alcohol (PVA), polyvinyl butyral (PVB), cobalt, nickel, or iron to hold the grains together, or in the absence of a binder, be physically pressed together under optional heat. Thus, the seeds of any of the following embodiments may also have multiple grains, though not depicted.

Figure 2A:
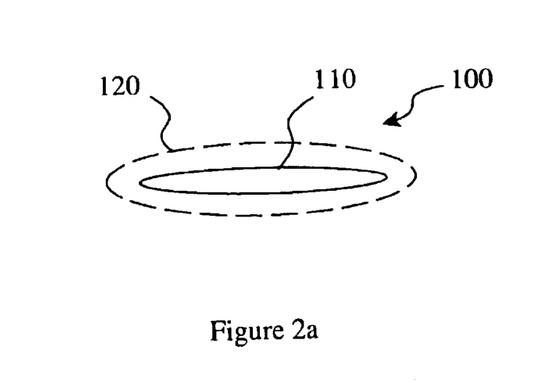
FIG. 2a is a schematic view of a coated seed having a needle shape.
Figure 2B:
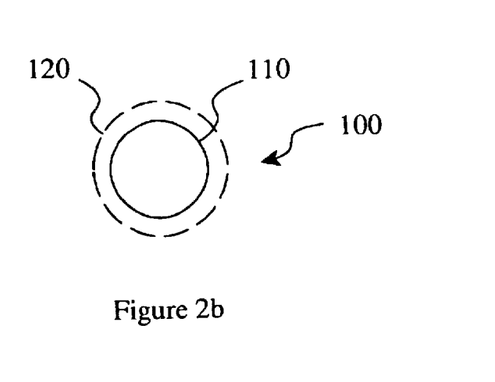
FIG. 2b is a schematic view of a coated seed having a round or spherical shape.

FIG. 2a shows a coated seed generally at 100, having a needle-shaped seed 110 of either a diamond or a non-diamond material, and solvent metal coating 120. As noted above, since the seed 110 is made of a non-diamond material such as metal or ceramic, it is much more easily shaped into a needle configuration. Although, the particular dimensions of the needle-shaped seed may vary, sizes in the range of about 100 to 5000 $\mu$m by about 40 $\mu$m to 500 $\mu$m are typical. A currently used needle-shape seed dimension is about 1000 $\mu$m by about 100 $\mu$m. Additionally, FIG. 2b shows a coated seed generally at 100 with seed 110 having a round or spherical shape with a single catalyst metal coating 120. Seeds having a round shape are particularly useful for the formation of a compact which will be discussed below. After the seed has been given the desired shape, it is coated and then subjected to a simple granulation process for applying a polylayer with diamond powder around the seed.

Crystal seeds may be formed from either diamond or non-diamond materials. Preferred non-diamond materials may be selected from several groups including ceramics, such as SiC, $Al_2O_3$, TiC, $B_4C$, carbides such as WC, TaC, or other metallic materials. The seed material is generally in the form of a powder, typically with granule sizes within the range of 40–100 mesh. In the case of monopoly compact grits used for wire drawing die applications, the seed crystal size will be determined by the actual size of the wires to be drawn. For example, in a die for drawing fine stainless steel or copper wire, it is recommended that a seed crystal should be larger than 30 mesh. The seed grits are then coated with a metal or non-metal material up to a thickness of about 10–100 $\mu$m. Suitable coating methods include electrolyze (electrolytic or non-electrolytic) coating, and a vacuum micro-vaporizing deposition process.

The step of coating the seed material is optional. However, according to this invention, it is preferred to coat the seed crystal with a suitable coating material prior to the fluidized bed granulation process, which adds a polylayer of either diamond powder or a mixture of diamond and metal powders onto the outer surface of the seed. It is also understood that the proper selection of the coating material as well as the coating thickness determines the microstructure of the final monopoly compact grit product.

This metallic or non-metallic coating can be done by a conventional spray type coating process. Such a process places the coating material on the external surface of the seed crystal in a fine powdered form. Although the process is somewhat different from a uniform layer coating (i.e.

electrolytic coating) its final behavior as a coating layer during the HPHT synthesis has proved to be acceptable. Alternatively, the coating layer of loosely packed powder may optionally be placed around the seed material and heat treated at an appropriate temperature in order to result in a hard coating layer around the seed.

The formulation of the diamond polylayer is accomplished by a modified spray type granulation process. This process, which takes place in the fluidized bed reactor, requires a slurry of fine diamond or non-diamond powder to be applied from the top of the reactor into a stream of upcoming coated or un-coated seed crystals which are lifted from the bottom of the reactor by forced air. The reaction temperature is in the range of 50~60° C. and the duration time for coating is from about 60 to about 100 minutes.

Figure 3A:
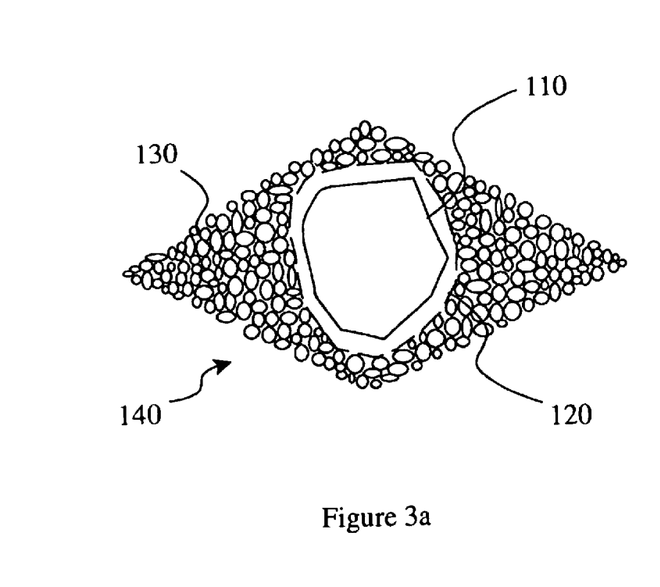
FIG. 3a is a top view of a monopoly precursor. The monopoly precursor has a seed in the center which may be of either a diamond or a non-diamond material, a catalyst metal solvent coating and a diamond forming powder, shaped around the seed into a configuration which is desired for the ultimate shape of the synthesized crystal.
Figure 3B:
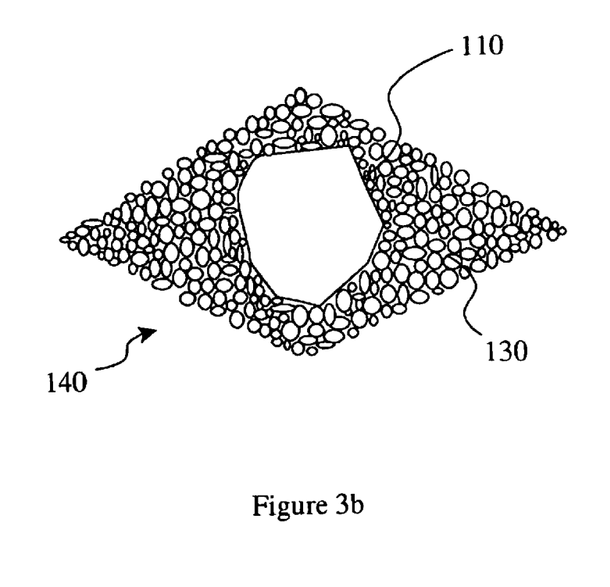
FIG. 3b is a view of a monopoly precursor, as in FIG. 3a, except the seed crystal is uncoated.
Figure 7:
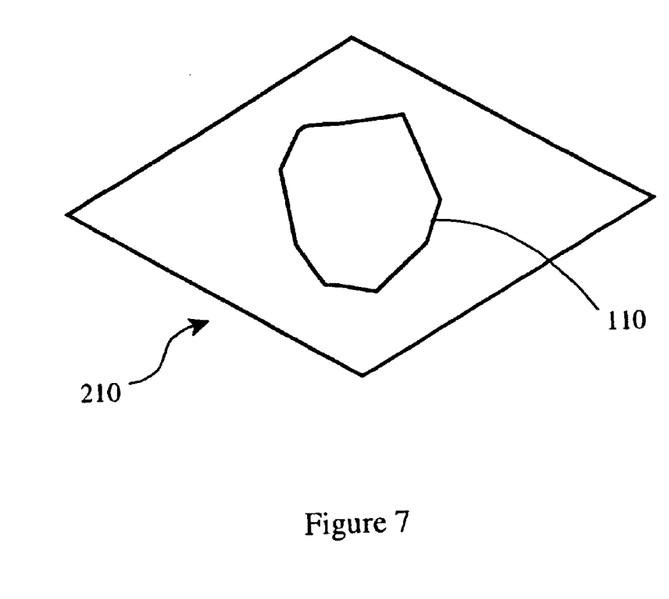
FIG. 7 is a schematic view of a polycrystalline grit having a predetermined shape and ready for incorporation into a tool.

FIG. 7 illustrates that the desired shape of a final grit product 210 is dictated by the configuration of the monopoly precursor material, prior to standard HPHT treatment, as shown in FIG. 3a or 3b. FIG. 3a shows a specific configuration of the monopoly precursor material 140. The chosen configuration may be affected by shaping the polycrystalline powder 130 around seed 110 optionally coated with solvent metal catalyst 120 (compare FIGS. 3a and 3b), utilizing a physical pressing method, such as can be employed in a pill press, followed by heat treatment under a vacuum in order to achieve a minor solidification of the precursor material.

In this polylayer granulation process, diamond powder is the preferred carbon source which is continuously supplied onto the seed crystal. Diamond powder is preferred over graphite as a carbon source. Although the exact reason for this preference is not fully understood, it is believed that the following benefits of diamond powder provide a basis. Diamond grains, compared to graphite or other carbonaceous material provide a cleaner carbon source and diamond is readily available in micron sized particles. Also, a diamond carbon source is less affected by the pressure exerted during the HPHT process than graphite. As a result, a final monopoly compact grit synthesized from a diamond carbon source will be larger than a grit from a graphite carbon source. Even though the preferred carbon source is diamond powder, the carbon source utilized in connection with the present invention can also include graphite, amorphous carbon, and isotopically pure diamond such as is disclosed in British patent GB2239011. Such diamond consists of isotopically pure carbon-12 or carbon-13.

A small amount of binder, such as PEG, PVA, PVB, alkylcellulose polymers, metallic binders such as cobalt, nickel, and iron or any other suitable binder known in the art, may be optionally added around the outer surface of the seed crystal during the process of polylayer formation, in order to adhere the small particles into a granulated form during the fluidized bed granulation process. This granulated form of polylayer comprised of a mixture of diamond powder, catalyst, and a binder, when coated around the seed crystal is called "monopoly precursor," as seen in FIGS. 3a and 3b. The monopoly precursor, whether or not shaped into a specific configuration, may be optionally heat treated in the controlled gas flow of the fluidized bed at a temperature of about 800° C. for a time of about 10 minutes. Alternatively, heat treatment can be affected in a typical vacuum furnace type apparatus with a controlled gas atmosphere. The main purpose of such heat treatment is to remove any organic matter which may be left over from the granulation of the polylayer and simultaneously strengthen the bonding between the agglomerated diamond powders.

Figure 4A:
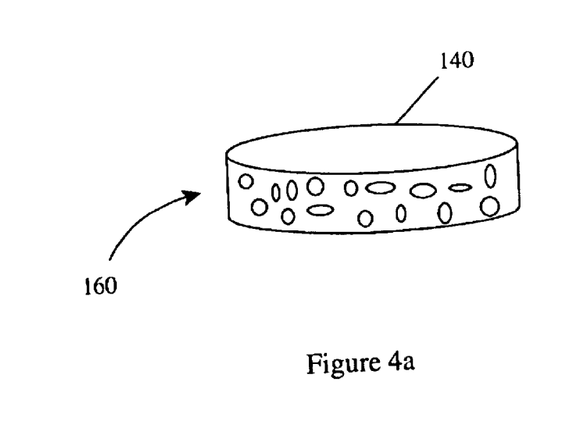
FIG. 4a is a perspective view of a compacted pellet disc which contains a plurality of monopoly precursors assembled therein.
Figure 4B:
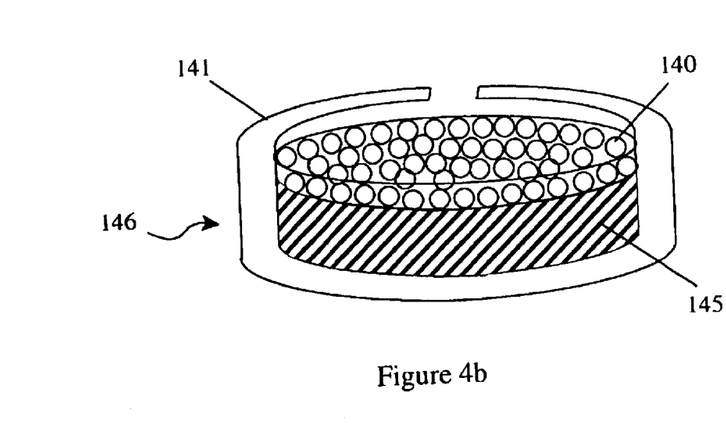
FIG. 4b is a perspective view of a reaction cup assembly including a substrate disc which contains a plurality of monopoly precursors assembled therein.
Figure 4C:
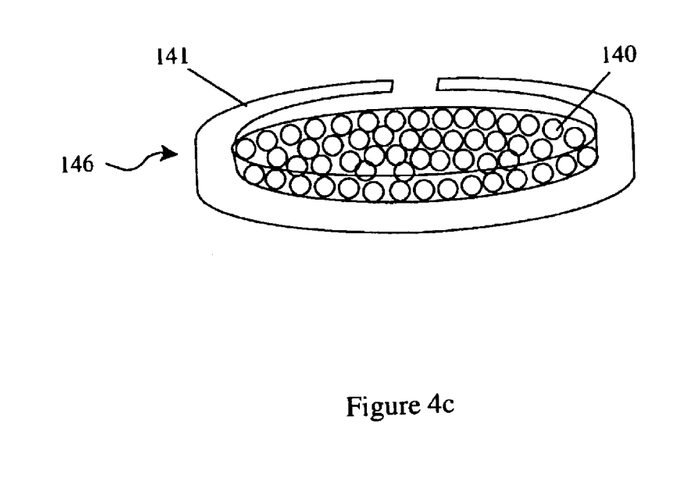
FIG. 4c is a perspective view of a reaction cup assembly without a substrate disc which contains a plurality of monopoly precursors assembled therein.
Figure 4D:
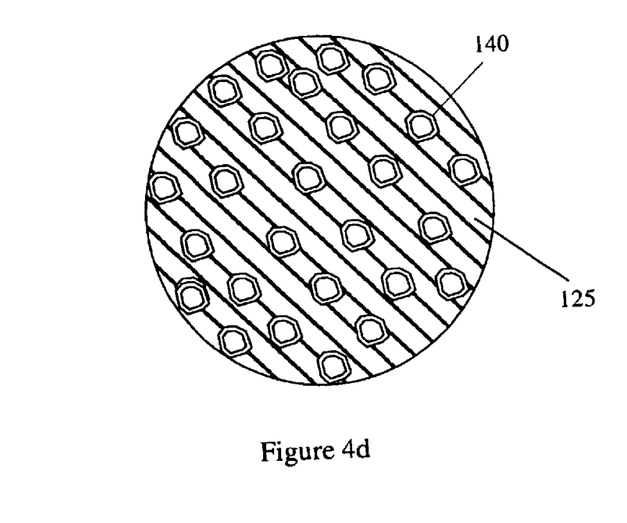
FIG. 4d is a top view of the assembly of FIG. 4b or 4c wherein the seeds are in an array.

Suitable catalysts for high pressure diamond growth are well known in the art. They include such metals as iron, aluminum, nickel, cobalt, tantalum, manganese, chromium and alloys thereof. FIG. 4a illustrates a perspective view of a loosely packed powder disc 160 containing a plurality of monopoly precursors 140. In another embodiment, the monopoly precursor material 140 is loaded into a typical cup 141 like tantalum with optionally a substrate disc 145 such as tungsten carbide disc as shown in FIGS. 4b and 4c, respectively to form a cup assembly 146. The loosely powder packed disc 160 or cup assembly 146 will be placed in a reaction cell for subsequent HPHT synthesis processing. FIG. 4d shows a top view of an array of individual precursors 140 loaded in regular arrays in the metal cup of FIG. 4b or 4c. One advantage of arranging the individual precursors in an array is to facilitate ease of removal of final monopoly grits through cutting processes such as laser or wire EDM or crushing. The shaded material 125 may be merely the underlying substrate 145 or a layer of diamond, CBN, ceramic, graphite, or a binder.

Figure 5A:
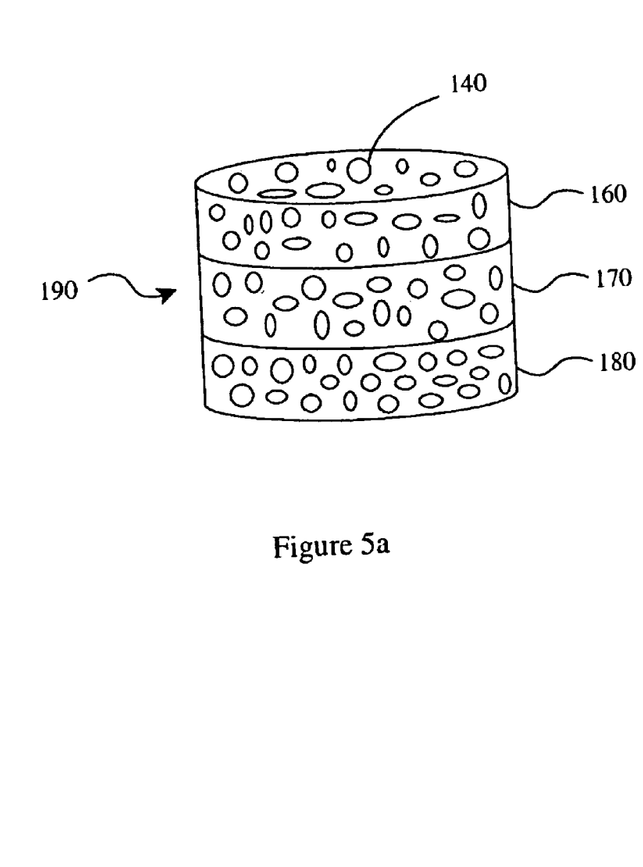
FIG. 5a is a perspective view of a plurality of compacts assembled for HPHT processing, each of which contains a plurality of monopoly precursors therein.
Figure 5B:
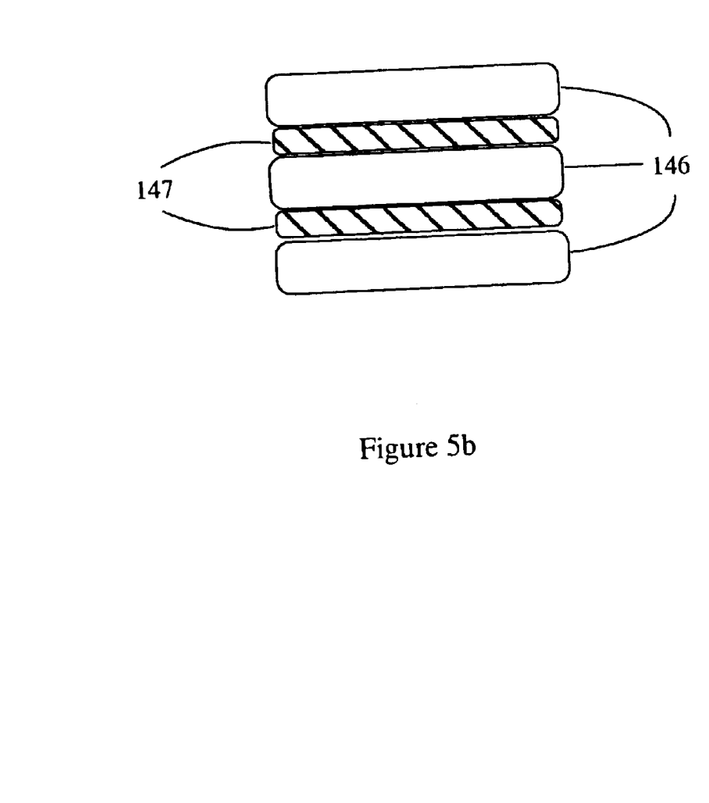
FIG. 5b is a perspective view of a plurality of compacts having spacers between layers.

FIG. 5a shows a loosely powder packed disc assembly 190 comprising a plurality of individual discs 160, 170 and 180, with each containing a plurality of monopoly precursors 140. Any number of discs may be assembled in such a manner prior to placement in a reaction cell in order to maximize the efficiency and configuration of the finished monopoly compact grit product, such as that shown in FIG. 5a or 5b. In an alternative embodiment, FIG. 5b shows a plurality of as-loaded metal cup assemblies 146 of FIG. 4b or 4c, which are separated by spacers 147 for convenience. Such spacers are well known in the art and may be made of materials such as salt, ceramic, graphite, or metal.

Additionally, a disc is not limited to the round configuration shown in FIGS. 4a through 5b, but rather may take any number of substantially flat shapes such as square, rectangular, triangular, or wafer-type shapes. Materials for the powder packed disc mediums are carefully selected for their relative reactivity with diamond/CBN and the metal catalyst. Another determining factor of disc medium, is its own phase transformation under HPHT conditions. Any volatile or undesirable reaction gas which might be generated from the disc medium would be critical to the formation of the monopoly compact grit under the HPHT process.

Experimentation has confirmed that high quality graphite, boron carbide, aluminum nitride, high purity alumina and hexagonal boron nitride are fully acceptable for the aforementioned wafer or powder packed disc. In particular, the addition of extra metal powder into the powder packed disc has been shown to facilitate the synthesis of diamond or CBN during the HPHT process. When crystal forming powder is used such as diamond or CBN, then a polycrystalline compact will be formed, which can be used as is, or cut into smaller pieces. Additionally, when a non-crystalline powder is used for packing the monopoly precursors within disc 160, then the individual specifically shaped grits will be easily retrieved from the mixture after the HPHT processing.

Once formed, the discs or as-loaded cup assemblies are placed into a typical HPHT reaction cell, as shown in FIGS. 5a and 5b, where the synthesis reaction occurs at about 1300~1500° C. and at about 40~60 kb (kilobars) for at least 6 minutes in order to grow a new phase of diamond or CBN, as well as to sinter diamond-to-diamond or diamond-to-nondiamond medium into a polycrystalline sintered or cemented structure. The high pressure apparatus may be any piece of equipment capable of inducing the necessary pressures to sustain diamond formation within the enclosed growth cell. Any such equipment, as is well known in the prior art, may be suitable. Additionally, heat can be supplied by any method known in the art for example, electrical resistance heating can be employed to attain the necessary temperatures to carry out the process of the present invention.

In the synthesis of diamonds from conventional carbonaceous materials, it is desirable to provide methods which can produce diamonds or CBN grits in shorter HPHT reaction times in order to reduce the overall manufacturing cost by reducing the wear and tear on the necessary processing equipment, and thus extending its effective useful life. According to the present invention, the monopoly precursors of FIGS. 3a and 3b can be converted to a size of 20~50 mesh from embedding in the loosely packed powdered discs as seen in FIGS. 4a and 5a. Monopoly precursors in this size range, when processed with the process of the present invention, yield stronger diamond grits within a shorter HPHT reaction time than existing methods.

Figure 6:
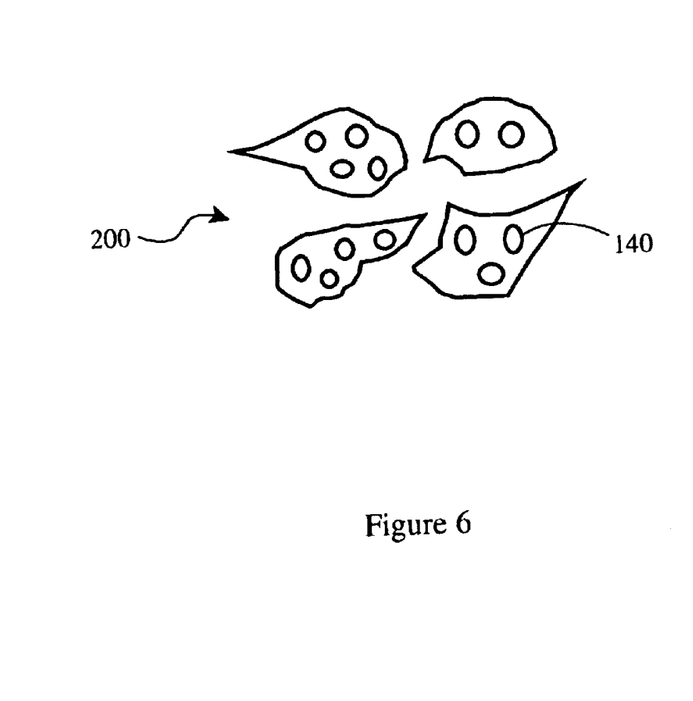
FIG. 6 is a top view of a plurality of compact pieces and finished top surface of the as-pressed reaction cup assembly of FIGS. 4b, 4c and 5b after the disc has been broken into several pieces.
Figure 8A:
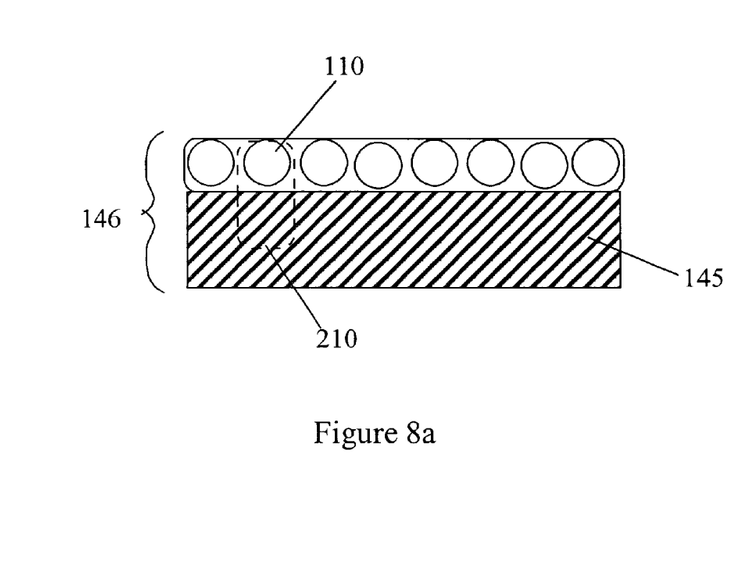
FIGS. 8a and 8b are schematic views of a final self-grown monopoly compact grit with a substrate disc in the form of either PCD compact grit or individual grit, respectively.
Figure 8B:
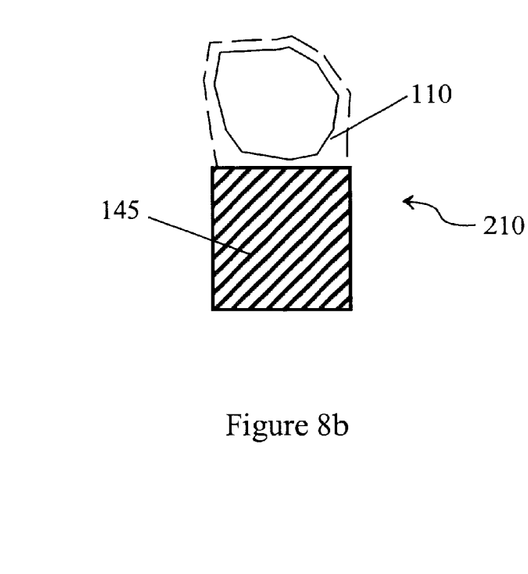

After undergoing the HPHT process, the discs of the present invention are removed from the reaction cell and crushed or cut in order to provide the final individual grits. FIG. 6 illustrates the crushed form of the HPHT cell discs, generally indicated at 200, and FIG. 7 illustrates a singly prepared monopoly compact grit 210 in final form as recovered from the HPHT synthesis operation. FIG. 8a shows another possible configuration, wherein the monopoly compact grit 210 is recovered from the as-pressed cup assembly 146 by conventional cutting means such as wire EDM or laser. FIG. 8b shows the recovered individual monopoly compact grit 210 which in this case includes a portion of the substrate 145 material, compare to FIG. 4b. A monopoly compact grit including a substrate as shown in FIG. 8b is useful for many applications including but not limited to incorporation into cutting tools, saw blades, wire drawing dies, drill bits, grinding wheels, polishing tools, dressing tools, and other machining tools known in the art.

The finally produced grits, are self-grown monopoly diamond or CBN compact grits whose internal structure is either a wholly self-grown mesh size crystal or an integrally self-bonded compact layer surrounding the starting seed crystal, depending on the substance or mixture of substances chosen for the polylayer. Further, the process may result in either a solid crystalline compact or individual grits which are separated out of the powdered discs.

In summary, the improved HPHT process of the present invention provides a method of achieving a desirable morphology for a monopoly compact grit. The improved process also includes proper preparation of a monopoly precursor material followed by the application of optimum Ptt (pressure-temperature-time) cycles during the HPHT synthesis process. The resulting monopoly compact grits, of varying composition, including diamond crystals, diamond seed-PCD grits, non-diamond seed-diamond grits, non-diamond seed PCD grits, and PCDBN grits, as fabricated in various desired shapes by the process of the present invention, are of particularly great value when incorporated into tools for industrial applications such as saw blades, drill bits, grinding tools, and machine tools. In addition to industrial tool applications, the monopoly compact grits of the present invention, may be a cost effective replacement for natural diamonds in some applications, as they have more desirable shapes and fewer defects. Further, the process of the present invention is capable of producing a thicker and more coarsely grained diamond than can be produced with traditional chemically vapor deposited diamond techniques. Finally, a monopoly compact grit product of the present invention may be cut, diced or finished to a broader range of shapes and configurations than is feasible for those produced by current techniques and may be used in many industries as a cutting or machine tool.

The applications for monopoly compact grits as produced by the present invention are numerous, and include the production of wire drawing dies of smaller dimensions, use as a heat sink in electronic applications, such as multi-chip modules and opto-electronic applications such as laser diodes. Other applications of the present invention include use in cutting tools, drill bits, saw blades, polishing tools, machining tools, grinding wheels, drawing, dressing, and finishing tools. Additionally, diamonds of the instant invention may be used as transparent windows in various applications such as in sensors and optics. Radomes for aircraft can also incorporate the articles of the present invention. Numerous single or semi-single crystal wire dies, heat sinks, optics, and radomes can be sliced from one plate of diamond generated by the instant invention.

EXAMPLES

The following examples 1~12, as illustrated in Table 1 and in text are presented to enable those skilled in the art to more clearly understand and practice the present invention. It is to be understood that while the invention has been described in conjunction with the below-listed specific embodiments thereof, that such embodiments are intended to illustrate, but not limit the scope of the present invention. Other aspects of the invention will be apparent to those skilled in the art to which the invention pertains. Examples 1~8 illustrate various embodiments of the invention. Table 1 summarizes the size of seed crystal, the type of coating and coating thickness, the polylayer composition and thickness, the sizes of the final monopoly grit products, and reference to a representative result figure.

Seed crystals of 70/80, 80/100, 100/120, and 120/140 mesh sizes were cleaned in hydrogen gas at 900° C. for 2 hours and then coated with the type of coating and coating thickness as indicated in Table 1.

Example 1

The nickel coating utilized was first carried out by a non-electrolytical process, using a solution of $NiCl_2 \cdot 6H_2O$, $NaH_2PO_2 \cdot H_2O$, $Na_2C_4H_4O_4 \cdot 6H_2O$, and $H_3BO_3$ at a temperature of 70~90° C. for about 20 minutes. This pre-Ni coated seed material was then nickel coated electrolytically, in a Ni-electrolytic bath in order to achieve a 100 $\mu$m thick coating.

This example employs a triple coating of Ni-Fe-Ni, another nickel coating was put on by electrolysis and then a thin layer of fine iron powder was applied by a spray granulation coating process which can provide a loosely packed powder over the nickel layer. Finally, a third nickel coating was electrolytically applied.

A polylayer precursor was prepared of a slurry of 1~3 $\mu$m diamond powder mixed with 1~5 $\mu$m of metal powder binder (Fe, Ni, or Co) per the composition indicated in Table 1. The metal coated seed crystals were then coated with this polylayer precursor in the fluidized bed at about 50° C. for approximately 80 minutes in order to provide a polylayer of about 200 $\mu$m thick.

This monopoly precursor was then thoroughly mixed with a packing medium disc such as ceramic powder and formed into a loosely packed powder disc. The disc was then assembled into an HPHT reaction cell, which was pressurized to approximately 55 kb and raised to a temperature of approximately 1400° C. in about 30 seconds, and held at this temperature for 20 minutes. The temperature was then lowered to room temperature, and the pressure was removed.

The monopoly compact grits were then recovered by breaking up the powder packed disc material with the removal of the metal or its oxide and any carbides present with an optional acid solution. The recovered monopoly grits of Example 1 show signs of new diamond growth 150 on the monopoly precursor 140, similar to that shown in FIG. 9a.

Example 2

The same process as in Example 1 was used, except for the variations as shown in Table 1, such as coating thickness, cobalt instead of iron coating, and use of a PEG binder in the polylayer precursor. The recovered monopoly grits of Example 2 show signs of new PCD growth 150, similar to that shown in FIG. 9b.

Examples 3–8

The same process as in Examples 1 and 2 were used with the variations as shown in Table 1. The resulting monopoly compact grits are shown in FIGS. 9b through 9e.

will be tested in a final finishing/turning of aluminum to create a monopoly cutting tool.

Example 10

A diamond seed of 40/50 mesh was cleaned in hydrogen gas at 900° C. for 2 hours. Next, the seed was coated by an non-electrolytic process using a solution of $NiCl_2.6H_2O$, $NaH_2PO_2.H_2O$, $Na_2C_4H_4O_4.6H_2O$, and $H_3BO_3$ at a temperature of about 70~90° C. for about 20 minutes. This pre-coated seed crystal was then nickel coated electrolytically, in a nickel electrolytic bath in order to achieve a 100 $\mu$m thick coating. This nickel coated seed diamond was then coated by a polylayer precursor consisting of a slurry of 1~3 $\mu$m diamond powder mixed with 1~5 $\mu$m cobalt powder in the presence of PEG. The thickness of the complete polylayer seed was about 250 $\mu$m.

This polylayer seed was loaded in one layer inside a conventional tantalum cup (as in FIG. 4b) along with a disc of WC support material and then assembled into a typical HPHT cell (as in FIG. 5b) which was pressurized to about 55 kb and raised to a temperature of about 1400° C. within

TABLE 1

Figure 9A:
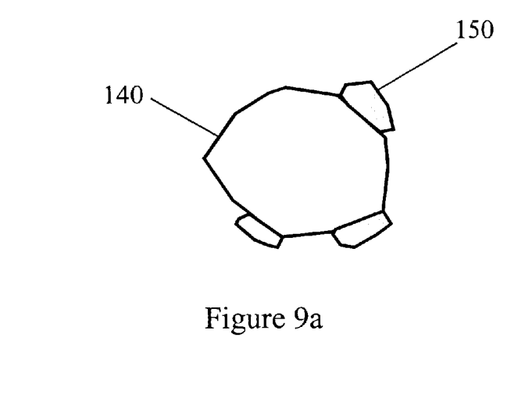
FIGS. 9a through 9e are schematic views of monopoly compact grits as formed in the experiments of Table 1.
Figure 9B:
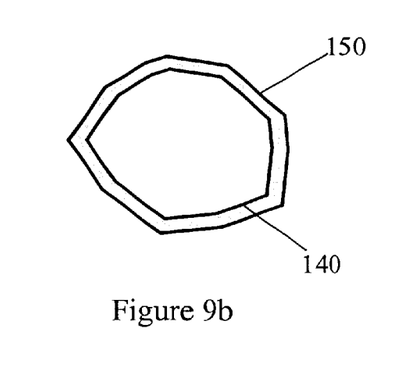
Figure 9C:
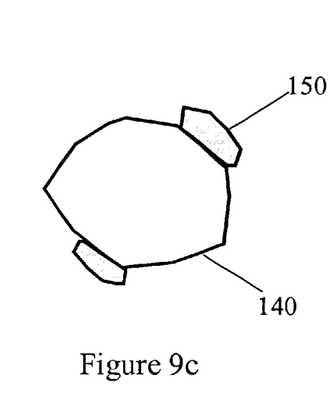
Figure 9D:
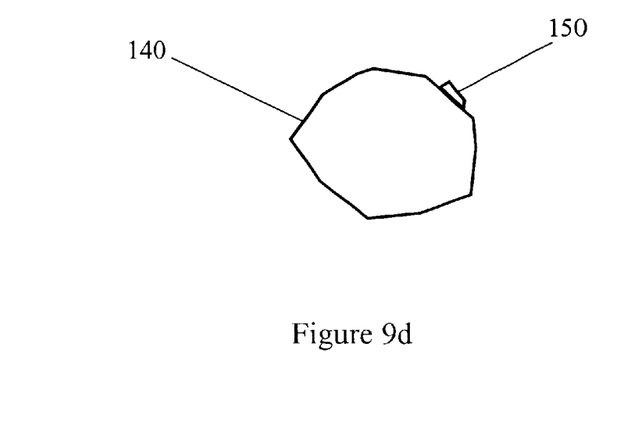
Figure 9E:
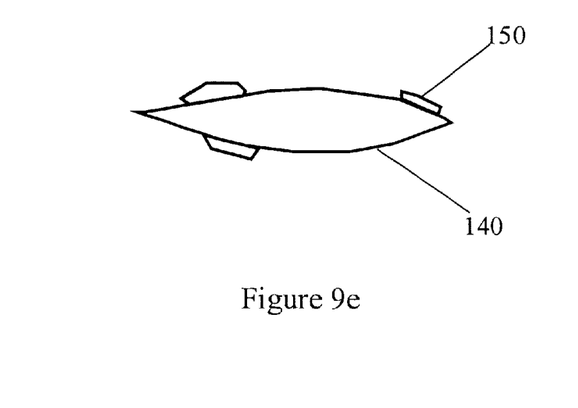

| Example No | Mono seed size (mesh) | Type of Coating | Coating thickness ($\mu$m) | Polylayer Precursor composition (vol %) | Polylayer thickness ($\mu$m) | Monopoly compact grit Result |
|---|---|---|---|---|---|---|
| 1 | Diamond 70/80 | Ni Ni—Fe—Ni | 100 40-10-40 | 1~3 $\mu$m diamond (100%) | 200 | FIG. 9a 70/80 mesh |
| 2 | Diamond 80/100 | Ni Ni—Co—Ni | 50 20-5-20 | 1~3 $\mu$m diamond (80%) Binder (20%) | 250 | FIG. 9b 80/100 mesh |
| 3 | Diamond 100/120 | Ni—Ti Ni—Fe—Ni | 50-2 40-10-50 | 1~3 $\mu$m diamond (100%) | 300 | FIG. 9c 100/120 mesh |
| 4 | CBN 80/100 | Ti—Al Ti—Si | 5-5 5-1 | 1~3 $\mu$m CBN (100%) | 200 | FIG. 9d 80/100 mesh |
| 5 | Ni-rod Needle-shape 1000 × 100 $\mu$m | No coating | 0 | 1~3 $\mu$m diamond | 300 | FIG. 9e |
| 6 | Diamond 120/140 80/100 | Ni—Co—Ni Ni—Co—Ni | 40-5-40 20-5-20 | 1~3 $\mu$m diamond (100%) | 300 | FIG. 9c |
| 7 | CBN 80/100 | Ni—Ti | 40-2 | 1~3 $\mu$m diamond (80%) Binder (20%) | 200 | FIG. 9b 80/100 mesh |
| 8 | Diamond 80/100 | Ni—Ti Ti—Ni | 20-2 2-20 | 1~3 $\mu$m CBN (80%) Binder (20%) | 200 | FIG. 9b 80/100 mesh |

Example 9

A mono-diamond seed of 25/30 mesh was prepared along with a very fine micron diamond powder for a reaction cup assembly as shown in FIG. 4b. This experiment was conducted in the typical high pressure high temperature reaction vessel by placing the blended diamond powder in a tantalum cup, as shown in FIG. 4b such that the mono-diamond seed is lined up in one layer and small size micron diamond is filled in the gap between the larger diamond seed crystals. The tantalum cup loaded with diamond powder was then placed in a typical HPHT apparatus (as shown in U.S. Pat. No. 3,745,623 which is incorporated herein) and subjected to a pressure of 55,000 atm and a temperature of about 1400° C. for about 20 minutes.

Upon removal from the reaction vessel, a disc of monopoly compact grits, wherein large seed crystals individually surrounded by a layer of sintered coherent diamond compact was obtained as a form of a typical PCD compact as in FIG. 8.

The disc was further subjected to laser cutting to cut out the individual monopoly compact grits (as in FIG. 8b) that about 13 seconds and held at this temperature for about 20 minutes. The temperature was then lowered to room temperature and the high pressure removed. The PCD disc of monopoly compact grit (as in FIG. 4d) was recovered by removing the cup and metal disc through a typical PCD finishing operation such as grinding and lapping steps. The PCD-like layer full of monopoly compact grits integrally bonded onto the WC support disc resulted in a well oriented individual monopoly seed crystal surrounded by a layer of PCD (as in FIG. 8b). The individual monopoly seed appears to have grown in size, although the growth is difficult to measure.

More importantly, numerous monopoly compact grits were well sintered in a matrix of one layer and each seed crystal yielded an integrally well bonded monopoly PCD exhibiting a seed crystal surrounded by a PCD layer. This experiment focused on the examination and evaluation of technical confirmation for monopoly seed to be either self-grown into a larger crystal and/or integrally bonded by a layer of PCD surrounding the seed crystal. The examination of the experimental sample has confirmed the morphology of the two above hypotheses. The seed crystal showed some growth and was surrounded with a typical compact layer which was clearly observed.

Example 11

The same experiment as in Example 9, except a CBN seed crystal with titanium coating was used instead of a diamond seed. The resultant monopoly PCBN product was obtained as a single CBN seed crystal surrounded by a PCD layer. A laser was then used to cut out individual monopoly PCBN in order to test as a cutting tool for ferrous materials.

Example 12

The same experiment as in Example 9, except the 30/40 mesh diamond seed crystal was prepared with a cobalt and/or cobalt-tungsten coating. Further, the reaction cup assembly included a fine size (2~4 $\mu$m) cobalt cemented tungsten carbide powder. Both materials were loaded into the tantalum cup such that the cobalt coated diamond seed was first loaded in the cup followed by tungsten carbide powder to fill in gaps and then a disc of cobalt cemented tungsten carbide was applied on top of the powders inside the cup. After HPHT processing as in Example 9, the individual monopoly compact grit was cut out by laser or wire EDM from the typical PCD disc form (as in FIGS. 8a and 8b).

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method for producing a self-grown monopoly compact grit comprising the steps of:
   a) preparing at least one seed crystal from a predetermined material and having a predetermined size;
   b) applying a polylayer precursor composition onto the entire surface of said seed crystal, wherein said polylayer precursor composition comprises a micron powder carbon source selected from the group consisting of diamond, CBN, and mixtures thereof;
   c) packing the at least one seed crystal coated with the polylayer precursor composition into a selected packing medium to form a monopoly precursor;
   d) loading the monopoly precursor into a growth cell and applying an amount of heat and an amount of pressure for a length of time, such that at least one newly synthesized polycrystalline monopoly compact grit is produced.

2. A method according to claim 1, wherein said seed crystal is a single mono-crystal.

3. A method according to claim 1, wherein said seed crystal is a composite comprising a plurality of crystals bound together to form a composite multiple-grain seed.

4. A method according to claim 1, wherein the amount of pressure is from about 20 kb to about 80 kb, and the temperature is from about 1300 to about 1600° C., and the length of time is about at least 6 minutes.

5. A method according to claim 1, further comprising the step of coating the seed crystal with a coating material, prior to applying the polylayer precursor composition.

6. A method according to claim 5, wherein said coating is at least a single coating layer applied to at least a portion of the seed crystal surface.

7. A method according to claim 5, wherein said coating is at least a single coating layer applied to the entire surface of the seed crystal.

8. A method according to claim 6, wherein said coating further comprises multiple coating layers.

9. A method according to claim 7, wherein said coating further comprises multiple coating layers.

10. A method according to claim 5, wherein the coating is a metallic coating material.

11. A method according to claim 5, wherein said coating material is a non-metallic coating material.

12. A method according to claim 10, wherein said coating is an element selected from the group consisting of Group VIII elements of the periodic Table, chromium, manganese and alloys thereof.

13. A method according to claim 10, wherein the coating is an element selected from the group consisting of Ni, Fe, Co, Si, Ti, Ta, Mo, Mn, Al, Cr and alloys thereof.

14. A method according to claim 13, wherein said coating is an element selected from the group consisting of Ni, Fe, Al, Co, Ti, Mn, Cr and alloys thereof.

15. A method according to claim 10, wherein said coating comprises a mixture of carbon and nickel.

16. A method according to claim 1, wherein said seed crystal is a diamond powder.

17. A method according to claim 1, wherein said seed crystal is a CBN powder.

18. A method according to claim 1, wherein said seed crystal is a non-diamond powder selected from the group consisting of ceramic, carbide, metal, or mixtures thereof.

19. A method according to claim 18, wherein said seed crystal is a metal powder.

20. A method according to claim 18, wherein said seed crystal is a ceramic powder.

21. A method according to claim 18, wherein said seed crystal is a carbide powder.

22. A method according to claim 18, wherein said seed crystal has a pre-determined shape.

23. A method according to claim 22, wherein said pre-determined shape of the seed crystal is a needle-like shape.

24. A method according to claim 1, wherein said seed crystal has a size of about 50 to about 270 mesh.

25. A method according to claim 1 wherein said polylayer precursor composition further comprises a binding agent in an amount from about 5 to about 50% by volume of the polylayer.

26. A method according to claim 1, wherein said polylayer precursor composition further comprises a mixture of diamond and CBN combined with an organic binding agent present in an amount from about 5 to about 50% by weight volume, of the total polylayer.

27. A method according to claim 26, wherein said organic binding agent is selected from the group consisting of PEG, PVA, and PVB.

28. A method according to claim 1 wherein said packing medium is a member selected from the group consisting of high quality graphite, boron carbide, aluminum nitride, high purity alumina, hexagonal boron nitride, and mixtures thereof.

29. A method according to claim 1, further comprising the step of subjecting the monopoly precursor to a heat treatment prior to the step of loading the monopoly precursor into the growth cell.

30. A method according to claim 29 wherein said heat treatment comprises heating the monopoly precursor at a temperature of about 800° C. for about 10 minutes.

31. A self-grown monopoly grit produced in accordance with the method of claim 1.

32. An article comprising a self-grown monopoly grit produced in accordance with the method of claim 1.

33. A wire drawing die comprising a self-grown monopoly compact grit produced in accordance with claim 26.

34. A heat sink comprising a self-grown monopoly compact grit produced in accordance with claim 26.

35. A saw blade comprising a self-grown monopoly compact grit produced in accordance with claim 26.

36. A drill bit comprising a self-grown monopoly compact grit produced in accordance with claim 26.

37. A grinding wheel comprising a self-grown monopoly compact grit produced in accordance with claim 26.

38. A polishing tool comprising a self-grown monopoly compact grit produced in accordance with claim 26.

39. The method of claim 1, further comprising the step of recovering individual newly synthesized monopoly compact grits.

40. The method of claim 39, wherein the individual monopoly compact grit is recovered through a process selected from the group consisting of physical crushing, laser cutting, and wire EDM.

41. The method of claim 1, further comprising the step of providing a substrate layer which is in contact with the packed seed crystal such that when the heat and pressure is applied the substrate is sintered/cemented to the seed crystal.

42. The method of claim 41, further comprising the step of recovering individual monopoly compact grits including a portion of the substrate.

43. The method of claim 41, wherein said substrate is tungsten carbide.

44. A self-grown monopoly grit produced in accordance with the method of claim 42.

45. An article comprising a self-grown monopoly grit produced in accordance with the method of claim 42.

* * * * *